(12) United States Patent
Gilliland et al.

(10) Patent No.: US 7,338,112 B2
(45) Date of Patent: Mar. 4, 2008

(54) EASILY REMOVABLE EXTERNAL PROTECTION SYSTEM FOR VEHICLES

(75) Inventors: Ian D. Gilliland, Sammamish, WA (US); William J. Dotinga, Lynden, WA (US); Jonathan D. Cowles, Newcastle, WA (US)

(73) Assignee: Exocage Systems Incorporated, Lynden, WA (US)

( * ) Notice: Subject to any disclaimer, the term of this patent is extended or adjusted under 35 U.S.C. 154(b) by 0 days.

(21) Appl. No.: 11/323,299

(22) Filed: Dec. 30, 2005

(65) Prior Publication Data

US 2008/0012362 A1    Jan. 17, 2008

Related U.S. Application Data

(60) Provisional application No. 60/713,503, filed on Aug. 31, 2005, provisional application No. 60/658,971, filed on Mar. 4, 2005, provisional application No. 60/640,765, filed on Dec. 30, 2004.

(51) Int. Cl.
*B60R 21/11* (2006.01)
(52) U.S. Cl. .............................. 296/190.03; 296/190.11; 296/1.04; 280/756
(58) Field of Classification Search ........... 296/190.11, 296/190.03, 1.04, 136.01, 136.07, 136.12, 296/146.6, 146.9; 293/117; 280/756
See application file for complete search history.

(56) References Cited

U.S. PATENT DOCUMENTS

| | | | | |
|---|---|---|---|---|
| 1,753,907 A | * | 4/1930 | Scherer | 160/207 |
| 3,552,514 A | * | 1/1971 | Alpers | 280/845 |
| 3,596,962 A | * | 8/1971 | Hertzell | 293/128 |
| 3,659,887 A | * | 5/1972 | Marquette | 293/128 |
| 3,704,031 A | * | 11/1972 | Confer | 280/756 |
| 3,868,141 A | * | 2/1975 | Johnson | 296/187.12 |
| 4,065,041 A | * | 12/1977 | Stegavig et al. | 224/327 |
| D262,790 S | * | 1/1982 | Bernier | D12/222 |
| 4,392,660 A | * | 7/1983 | Mason et al. | 280/751 |
| 4,428,599 A | | 1/1984 | Jahnle | |
| 4,601,487 A | * | 7/1986 | Hoffman | 280/756 |
| 4,798,399 A | * | 1/1989 | Cameron | 280/756 |
| 4,879,543 A | * | 11/1989 | Smith, Sr. | 340/473 |
| 5,028,071 A | * | 7/1991 | Bolam | 280/756 |
| 5,094,313 A | * | 3/1992 | Mauws | 180/210 |
| D350,724 S | * | 9/1994 | Lichtbach | D12/412 |

(Continued)

OTHER PUBLICATIONS

International Search Report, PCT/US05/47674, Oct. 20, 2006.

*Primary Examiner*—Dennis H. Pedder
*Assistant Examiner*—Mike Hernandez
(74) *Attorney, Agent, or Firm*—Todd N. Hathaway

(57) ABSTRACT

Systems and methods for mounting an easily removable, external protective system on a vehicle such as an internal combustion vehicle such as a car, truck, SUV, etc. One function of the system is to allow the occupants to enter and exit the vehicle without removing the system. Certain embodiments of the invention will be discussed and illustrated principally as it applies to Land Rovers' Discovery SUV. However it can be applied to any of a variety of vehicles, or even other mobile units such as camper shells. The invention can be advantageous, for example, as it provides protection for the body of the vehicle from many impacts where it would normally be vulnerable. The system comprises removable external tubing attached to fixed mounting points and can be comprised of several mounting systems (see diagrams for specific construction).

38 Claims, 16 Drawing Sheets

U.S. PATENT DOCUMENTS

| | | | |
|---|---|---|---|
| 5,680,976 A * | 10/1997 | Koliopoulos et al. | 224/524 |
| 5,746,362 A * | 5/1998 | Hickey | 224/331 |
| 5,931,524 A * | 8/1999 | Jones, Jr. | 296/177 |
| 6,065,799 A | 5/2000 | Suwabe et al. | |
| 6,371,767 B1 * | 4/2002 | Libby | 434/373 |
| 6,890,036 B2 * | 5/2005 | Wiener et al. | 297/487 |
| 6,908,107 B2 * | 6/2005 | Barth | 280/756 |
| 7,032,958 B2 | 4/2006 | White et al. | |
| 7,097,237 B2 * | 8/2006 | Weiner et al. | 296/190.11 |
| 7,131,686 B1 * | 11/2006 | Jo et al. | 296/190.03 |
| 2003/0030302 A1 * | 2/2003 | Hoppenstein | 296/203.01 |
| 2005/0258626 A1 * | 11/2005 | Hill | 280/756 |

\* cited by examiner

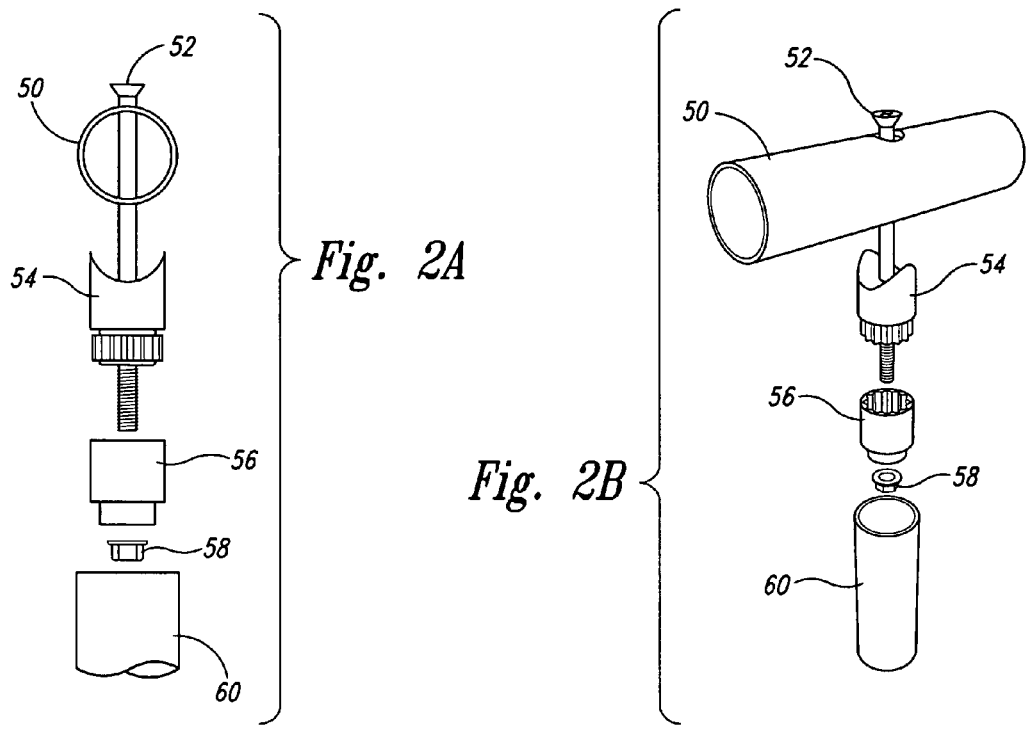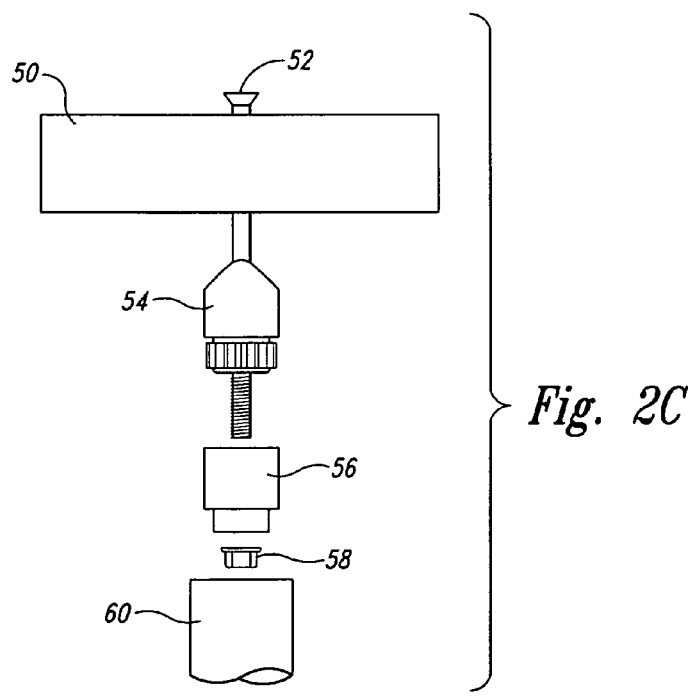

EASILY REMOVABLE EXTERNAL PROTECTION SYSTEM FOR VEHICLES

CROSS-REFERENCE TO RELATED APPLICATIONS

The present application claims priority from U.S. provisional patent application No. 60/640,765, filed Dec. 30, 2004; U.S. provisional patent application No. 60/658,971, filed Mar. 4, 2005; U.S. provisional patent application No. 60/713,503, filed Aug. 31, 2005, which are incorporated herein by reference in their entirety and for all their teachings and disclosures.

BACKGROUND

Sales of off-road vehicles such as Sports Utility Vehicles (SUVs) and all-terrain vehicles have sky-rocketed in the United States, accounting for over 25 percent of all new-vehicle sales in 2004 and representing almost 14 percent of all registered vehicles in the nation, with more than 22 million on the road. However, when people drive these vehicles off-road or in areas of the world having poor road systems, the bodies of these vehicles can be easily damaged, scraped and dented. There is a need for an exterior protective device for vehicles, especially when the vehicles are driven off-road or on poor road systems, wherein the protective device is easily removable. The present systems and methods provide these and other advantages.

SUMMARY

The present invention fills this need by providing for an easily removable external protection system for a vehicle sized to convey at least one human being, the protection system configured to form at least a partial cage that at least partially encompasses at least three sides of the vehicle, the cage comprising at least two mounting points configured to easily removably attach the cage to the vehicle, and a plurality of elongated members configured to form a web that protects portions of the vehicle surrounded by the web, wherein at least three of the elongated members are configured to easily removably attach to each other such that at least each of the adjacent sides of the cage can be easily attached to and separated from each other.

The present invention is also a method of creating an easily removable external protection system for a vehicle sized to convey at least one human being comprising:

a) providing a plurality of elongated members configured to form a plurality of webs that each protect a portion of the vehicle surrounded by the web, wherein the webs comprise at least three adjacent sides of a cage; and, b) removably attaching the plurality of webs to each other to provide at three adjacent sides of the cage, the cage configured to at least partially encompass at least three sides of the vehicle.

The present systems and methods comprises methods and compositions

Removable Mounting Systems (RMS):

In one embodiment, the systems comprise easily removable mounting systems, for example as depicted in the figures. Such a system, and methods of making, attaching, detaching and otherwise using such systems, can include a variety of components such as one, two, three or more (or all) the following:

1) A clamping mechanism for retaining a pipe to the roofline. (Drip Rail Mounting System)
2) A permanent tab extending from one pipe that retains another pipe with a bolt traveling through the first tab and the extension of the second pipe. (Roof Rack Tab)
3) A removable retaining mechanism that joins one pipe to another pipe with a protective bushing between the two. (Pipe End Attachment System)
4) A hinge system created by fixed points on each end of two pipes and a bolt between the two that also acts as a rotation/hinge point. (Door Slider Hinge)
5) A hinge with a retractable pin internal to one pipe that acts as a retaining and horizontal rotation point for another pipe with an external tab for mating of the two. (Interior Pipe Door-Hinge)
6) A pipe or mount with a shaped external end that acts as a receiving point for a slotted shaped internal end on a pipe or mount. (System Bumper)
7) A pipe or mount with a shaped internal end that acts as a receiving point for a slotted shaped external end on a pipe or mount. (Tab Mounting System)
8) A slotted pipe that retains its position relative to the full range of movement of a door through an attachment sliding mechanism between the door and the pipe. (Door Slider System)
9) A metal plate attached to a fixed mounting point internal to the door and extending outside the vehicle for attachment and retention of a pipe. (Door Plate Mount)

Each of the components itself, as well as the system(s) as a whole and combined portions thereof, can comprise new features, configurations or aspects compared to systems in existence prior to this patent application. Further, each of the components, as well as the system as a whole, can be modified in light of the discussion herein yet stay within the scope of the features, configurations and aspects, etc., discussed herein. For example, where a screw is indicated, any kind of suitable fastener can be used, and the transverse cross-section of the rails can be round (a preferred embodiment) or hexagonal or other-shaped as desired. Moreover, the aspects herein also include partial cages, for example the cage can but does not have to encompass the entire vehicle (or other structure), or it can encompass only the latter half of the vehicle, the middle portion (either vertically or horizontally), etc. The systems do preferably need to encompass at least a part of the vehicle, such as a front end (as opposed to essentially providing a wall, such as a front bumper/grill protective framework that sits in front of the front bumper, or atop the front bumper and in front of the grill).

Fixed Mounting Points:

The systems and methods can use fixed mounting points mounted, for example semi-permanently, to the vehicle as anchoring points. Two of the fixed mounting points can be a front and a rear vehicle bumper (e.g., FIG. 1, Items 12 and 14). The bumpers are typically attached to factory hard points defined by the specifications of the given vehicle. Two or more fixed mounting points can also run the length of both sides of the body protecting the rocker panels (the section of body sheet metal between the front and rear tires at the lowest point of the vehicle body) and can be attached to factory hard points defined by the specifications of the given vehicle (e.g., FIG. 1, Item 16). Another mounting point can be in a semi-removable position surrounding the upper roofline and retained by a clamping mechanism (RMS 1 shown in FIG. 7).

As noted previously, the embodiments discussed above and depicted in the figures are illustrative and not limiting. Suitable modifications can be made in light of the current discussion and remain within the scope of the discussion herein.

These and other aspects, features and embodiments are set forth within this application, including the following Detailed Description and attached drawings (unless expressly stated otherwise or clear from the context, all embodiments, aspects, features, etc., can be mixed and matched, combined and permuted in any desired manner). In addition, various references are set forth herein, including in the Cross-Reference To Related Applications, that discuss certain systems, apparatus, methods and other information; all such references are incorporated herein by reference in their entirety and for all their teachings and disclosures, regardless of where the references may appear in this application.

BRIEF DESCRIPTION OF THE DRAWINGS

For the purpose of this discussion the term "pipes" indicates the connecting spans that encompass the vehicle. Objects of varying size, shape, material and construction can be used to form these spans. The following figures provide illustrative, non-limiting examples of the systems, devices, methods, etc., discussed herein. Suitable modifications can be made in light of the current discussion and remain within the scope of the discussion herein.

Protective pipes connect and form an embodiment of the system in a number of easily removable systems and methods.

FIGS. 2 (a)-(c) show system and method, called removable mounting system 3 (RMS 3) for attaching one pipe end to the side of another pipe in an easily removable fashion that restrains the pipes from moving in relationship to each other.

DETAILED DESCRIPTION

Figure 1A:
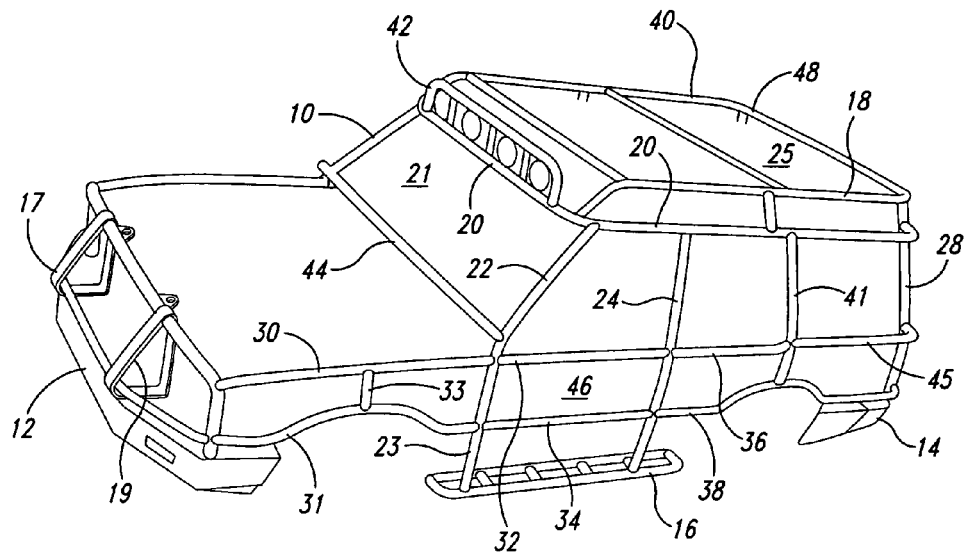
FIGS. 1 (a) an 1 (b) show two views of a vehicle having a preferred embodiment of the present invention, identifying the main sections of the easily removable protective system. Parts identified discuss the driver's side components. Except where noted, matching parts reside on the other side of the vehicle as well. Other connecting and retaining systems and methods are defined in detail in their own figures.

The following paragraphs provide definitions of some of the terms used herein. All terms used herein, including those specifically discussed below in this section, are used in accordance with their ordinary meanings unless the context or definition clearly indicates otherwise. Also unless expressly indicated otherwise, the use of "or" includes "and" and vice-versa. Non-limiting terms are not to be construed as limiting unless expressly stated, or the context clearly indicates, otherwise (for example, "including," "having," and "comprising" typically indicate "including without limitation"). Singular forms, including in the claims, such as "a," "an," and "the" include the plural reference unless expressly stated, or the context clearly indicates, otherwise.

The scope of the present systems and methods, etc., includes both means plus function and step plus function concepts. However, the terms set forth in this application are not to be interpreted in the claims as indicating a "means plus function" relationship unless the word "means" is specifically recited in a claim, and are to be interpreted in the claims as indicating a "means plus function" relationship where the word "means" is specifically recited in a claim. Similarly, the terms set forth in this application are not to be interpreted in method or process claims as indicating a "step plus function" relationship unless the word "step" is specifically recited in the claims, and are to be interpreted in the claims as indicating a "step plus function" relationship where the word "step" is specifically recited in a claim.

Other terms and phrases in this application are defined in accordance with the above definitions, and in other portions of this application.

As stated above, the present invention is an easily removable external protection system for a vehicle sized to convey at least one human being, the protection system configured to form at least a partial cage that at least partially encompasses at least three sides of the vehicle, the cage comprising at least two mounting points configured to easily removably attach the cage to the vehicle, and a plurality of elongated members configured to form a web that protects portions of the vehicle surrounded by the web, wherein at least three of the elongated members are configured to easily removably attach to each other such that at least each of the adjacent sides of the cage can be easily attached to and separated from each other.

The present invention is also a A method of creating an easily removable external protection system for a vehicle sized to convey at least one human being comprising:

a) providing a plurality of elongated members configured to form a plurality of webs that each protect a portion of the vehicle surrounded by the web, wherein the webs comprise at least three adjacent sides of a cage; and, b) removably attaching the plurality of webs to each other to provide at three adjacent sides of the cage, the cage configured to at least partially encompass at least three sides of the vehicle.

Figure 1B:
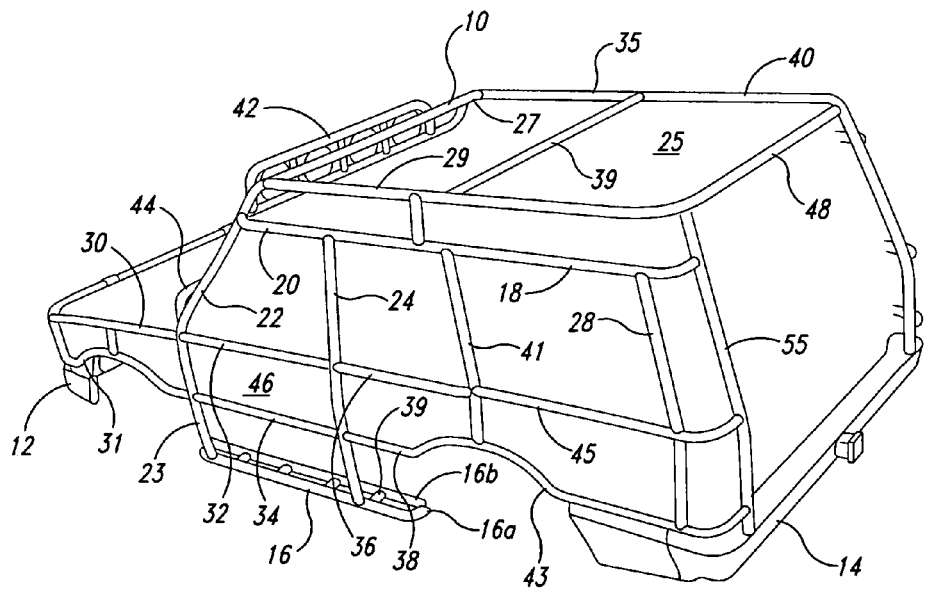

The present invention is further illustrated by the embodiment described below referring to the figures. The embodiment below is only one embodiment. Many different configurations of the present invention are possible depending on the type and shape of the vehicle that is being protected. The important aspects of the invention in which removable bars, pipes or girders are attached along the sides and top of the vehicle and that the bars extending along the door are so attached so that the doors can be readily opened without removing the protective bars. An embodiment of the present invention is shown in FIGS. 1 (a) and 1 (b). FIGS. 1 (a) and 1 (b) show two views of the sample vehicle identifying the main sections of the easily removable protective system (10). In connecting the bars to the vehicle and to each other many connecting means can be used and FIGS. 2-11 illustrate just a few options. The connecting means may differ depending on the type and shape of the vehicle. Certain connecting and retaining systems and methods are shown in their own figures.

An assembly of rigid parts mounted and connected to each other and the vehicle to form an easily removable protective system. Each part listed can be connected by one of the Removable Mounting Systems listed above.

Preferably, the protective system is assembled and attached in modular units. For example, at the front of the vehicle upper transverse bar 13, lower transverse bar and stabilizing triangular brackets 17 and 19 are attached as one unit to front bumper 12.

Another modular unit is formed by the connection of upper front longitudinal bar 30 to lower front longitudinal bar 31 by means of vertical bar 33.

Along windshield 21 runs pipe 22, which is attached as one modular unit with pipe 23, which runs vertically along the front edge of door 25.

A protective rocker panel—step rail 16 is one integrative unit in which pipes 16 (*a*) and (*b*) are welded together and stabilized by transverse braces 16 (*c*), (*d*), (*e*) and (*f*).

Vertical bar 24 is one continuous unit and is attached to rocker panel 16. Vertical bar 24 is also attached to bar 20, which runs along the edge of the front of the roof of the vehicle. Bar 18 runs laterally along the rear of the top of the roof and connects to bar 20.

A modular unit is formed by bar 20, which extends at the edge of the roof along the driver's front door bending at a 90 degree angle extending above the windshield and making another 90 degree bend to extend over the front passenger door at the edge of the roof. The section of bar 20 that extends above the windscreen has permanently mounted at the front of the vehicle and above the front windscreen a light bar section 42. It is constructed of one main-pipe (the longest), which travels horizontally above the windscreen, then turns downward where the main-pipe mounts permanently to the section pipe 20 above the windscreen. Three shorter vertical pipes 42 (*a*), (*b*) and (*c*) are permanently attached vertically and between the upper main-pipe 42 and the lower Drip Rail Front Section (20). Spaced in positions below the Light Bar and on the Drip Rail Front Section are means for retention and placement of 4 vehicle lights 42 (*d*), (*e*), (*f*) and (*g*).

Another modular unit, which attaches to the vehicle as a single structure is comprised of vertical bar 41, which is welded to lower lateral bar 43, which is also welded to vertical bar 28. Welded to both vertical bar 28 and vertical bar 41 is transverse bar 45. Rear vertical pipe 55 is attached to transverse pipe 45 and lower lateral pipe 43.

Pipes from one modular protective unit can be removably connected to pipes of another modular protective unit or to the vehicle by many different means including but not limited to one or more removable mounting systems (RMS) shown in FIGS. 2-12.

The rear bumper (14) can be a solid bumper mounted to the vehicle in a semi-permanent position at hard points determined by the factory specifications of the vehicle. Typically, metal panels extend from the outside ends of the rear bumper towards the trailing edge of the rear wheel well to protect the lower body panels.

Figure 11A:
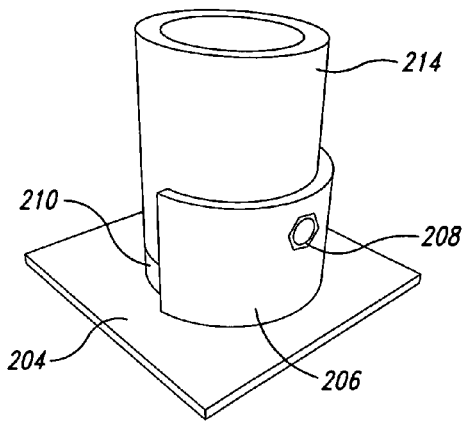
FIGS. 11 (a)-(c) show RMS 6.
Figure 11B:
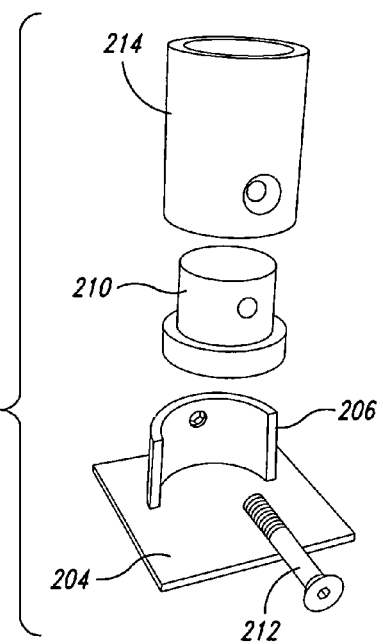
Figure 11C:
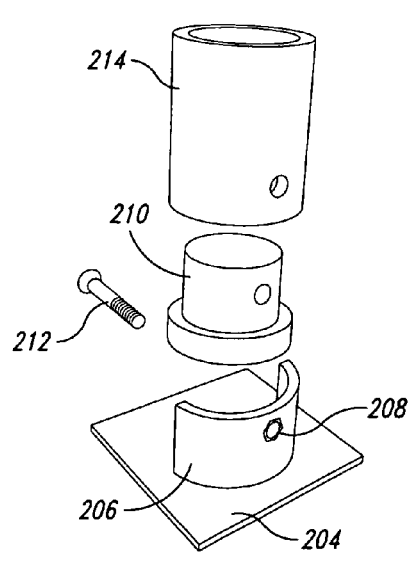

Each corner of rear bumper can be connected to the bottom of pipe 55 using an RMS 6 [FIGS. 11 (*a*)-(*c*)]. An assembly of pipes forms the protective Rocker Panel—Step Rail mounting point (16). In the embodiment shown, a continuous pipe 16 (*a*) extends from the vehicle and bends at 90 degree angles at each end where it can be mounted, permanently if desired, to a second pipe 16 (*b*) which travels lengthwise to the vehicle and can be mounted in a semi-permanent fashion to hard points determined by the factory specifications of the vehicle. 4 smaller pipes connect between the inside and outside bars to provide greater support to the system. An outside pipe 16 (*a*) of step rail 16 has two slots to receive and connect to down pipe 22 and mid-door pipe 24 using RMS 7 shown in FIGS. 6 (*a*)-(*d*).

The Drip Rail Mounting Point (18 and 20) can be comprised of two bent pipes (one slotted (20) to allow insertion and retention of the smaller ends of the other pipe (18)) that travel along the front and both sides at the roofline. Rails 18 and 20 can be removably attached onto the top edge of the roof, which is usually a drip rail using a plurality of RMS 1 connectors (usually about 4 on each side) [shown in FIGS. 7 (*a*)-(*c*)] spaced evenly along each of the vehicle sides, retain parts (18) and (20) to the roof of the vehicle. Pipes (18 and 20) have recessed holes drilled through them to receive and retain parts (22, 24 and 28) using RMS 3 [FIGS. 2 (*a*)-(*c*)]. An RMS 2 [FIGS. 12 (*a*) & (*b*)] connector can be welded near the both front corners of pipe (20) to receive part of the retention system of the Roof Rack (40). Near the trailing corner of the vehicle, pipe (18) can be connected to pipe 55 using an RMS 2. The Front Door Down-Pipe (22) can be an easily removable pipe that travels along the leading edge of the driver and front passenger doors, and can be mounted to point pipe 20 with an RMS 3 and mounted to outside pipe 16 (*a*) of step rail 16 using an RMS 7 connector [FIGS. 6 (*a*)-(*d*)]. Pipes 30 and 44 are also connected to pipe 22 by means of an RMS 3 connector.

Pipe 22 can also be connected to pipes 32 and 34 by an RMS 2 connector. The hood support (44) connects the pipes (22) on each side of the vehicle to each other with points (RMS3). The Mid-Door Down Pipe (24) travels along the side of the vehicle body and between the trailing edge of the front door and the forward edge of the rear door. At two points located where the Front Door Pipes (32 and 34) each intersect with (24) are Door Pipe Receivers (FIG. 10) shaped to meet flush with the door pipes and to keep the pipes (32 and 34) from traveling beyond the mounts fixed position as the door rotates into its final closed position. The Down Pipe (24) can be mounted to the system at three points, one end at the Drip Rail (20) with (RMS3), another in the middle at the door plate (RMS 9) and at the other end to the Step Rail (16) (RMS 7).

Figure 9A:
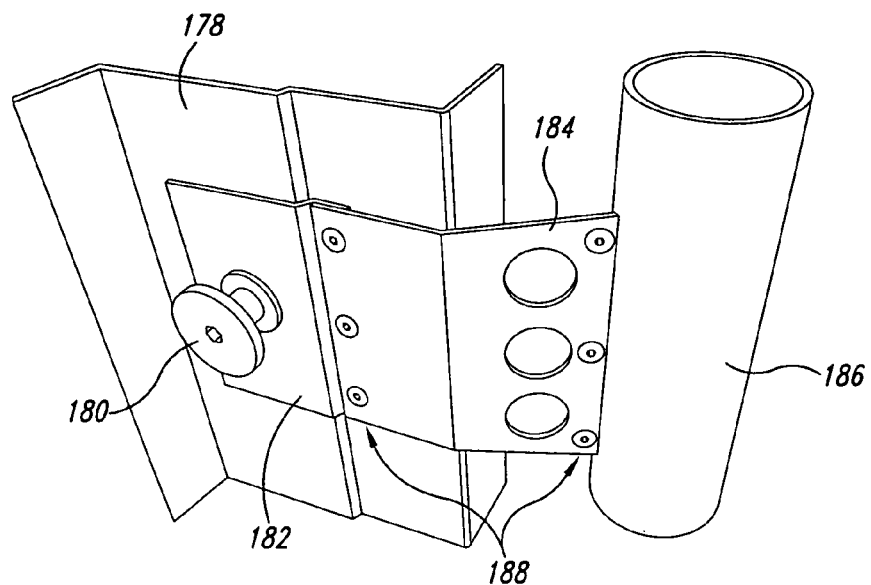
FIGS. 9 (a) & (b) show RMS 9.
Figure 9B:
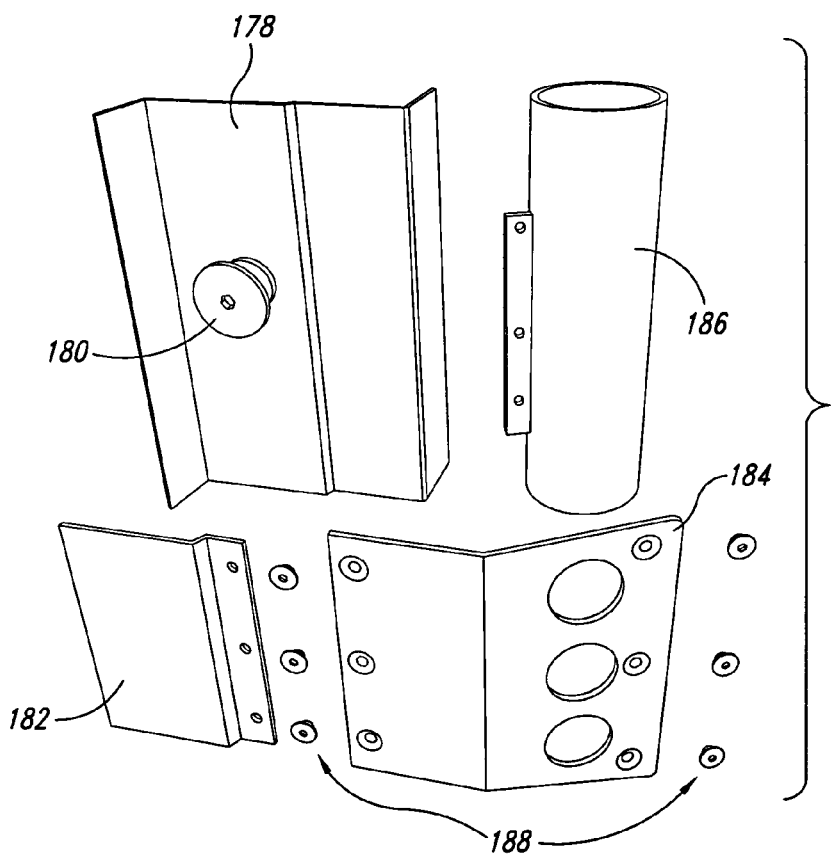
Figure 10A:
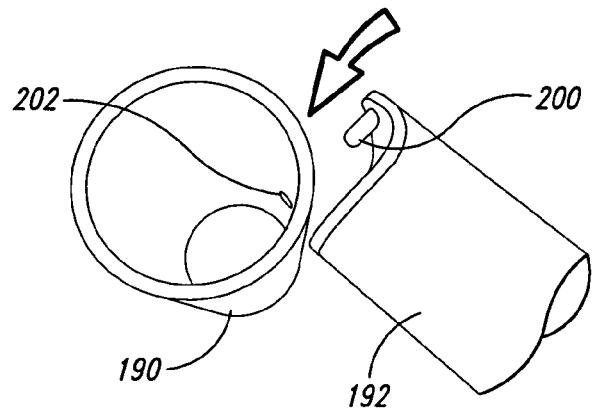
FIGS. 10 (a)-(d) show a door pipe receiver.
Figure 10B:
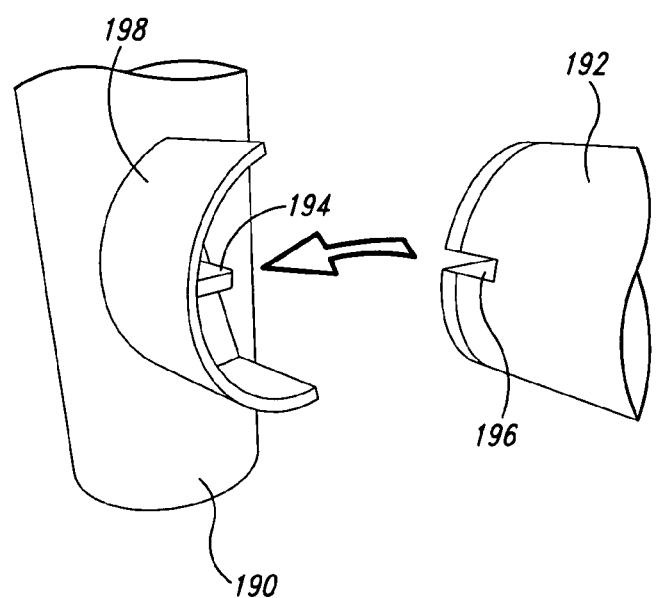
Figure 10C:
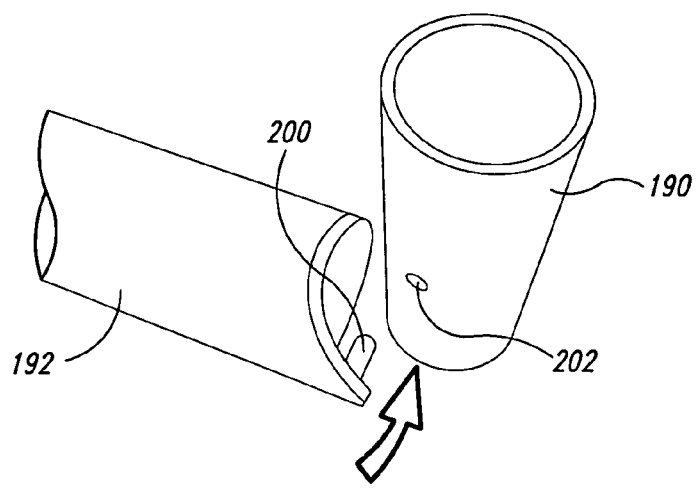
Figure 10D:
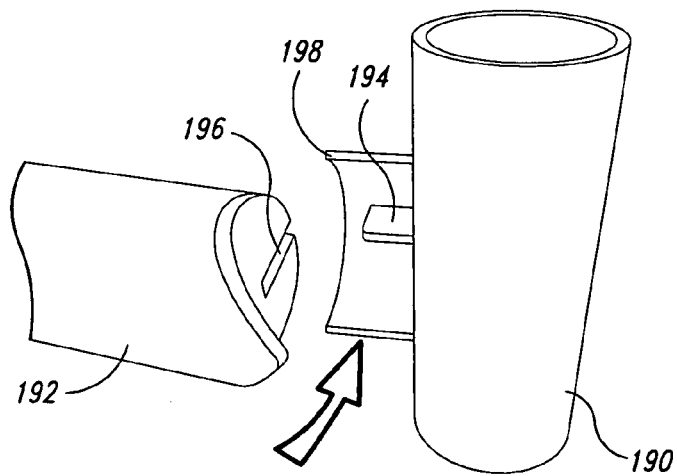

Rear-most vertical pipe 55 is connected to rear of drip rail pipe 18 by means of an RMS 2 connector. The bottom of pipe 55 is connected to the outside corner of rear bumper 14 by means of a RMS 6 connector (FIG. 11). Pipe 24 can be connected to pipe 20 and pipe 41 can be connected to pipe 18 using RMS 3 connecters. The mid-end of pipe 41 can be connected to the vehicle door jam in a semi-permanent fashion by means of a RMS 9 connecter (FIG. 9).

At each point where The Passenger Door Top Pipe (36) and the Passenger Door Bottom Pipe (38) intersects with the front edge of the third vertical pipe 41 are Door Pipe Receivers as shown in FIG. 10 shaped to meet flush with the door pipes 36 and 38 and to keep the pipes from traveling beyond the mounts' fixed positions as the door rotates into its final closed position.

The top pipe 30 travels horizontally along the upper corner edge of the front fender and is connected to pipe 22 and bumper 12 by means of RMS 3 connecters. The bottom pipe 31 travels alongside the body panel in a manner that mirrors the section of fender it travels over connecting to bumper 12 and vertical pipe 22 by means of RMS 3 connecters. The Front Door Top Pipe 32 travels horizontally along the front door, below the window and between the front door vertical pipe (22) and the mid-door vertical pipe 24.

Figure 5A:
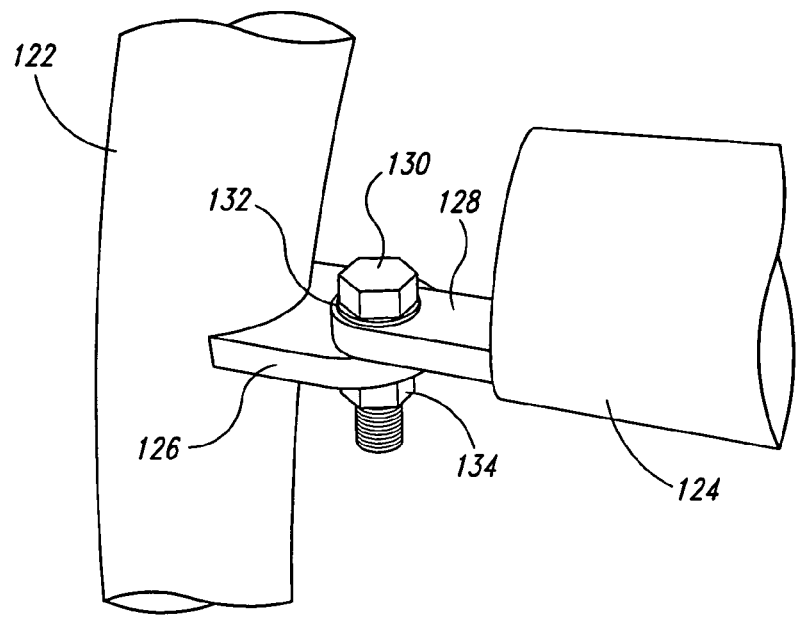
FIGS. 5 (a) & (b) show RMS 4.
Figure 5B:
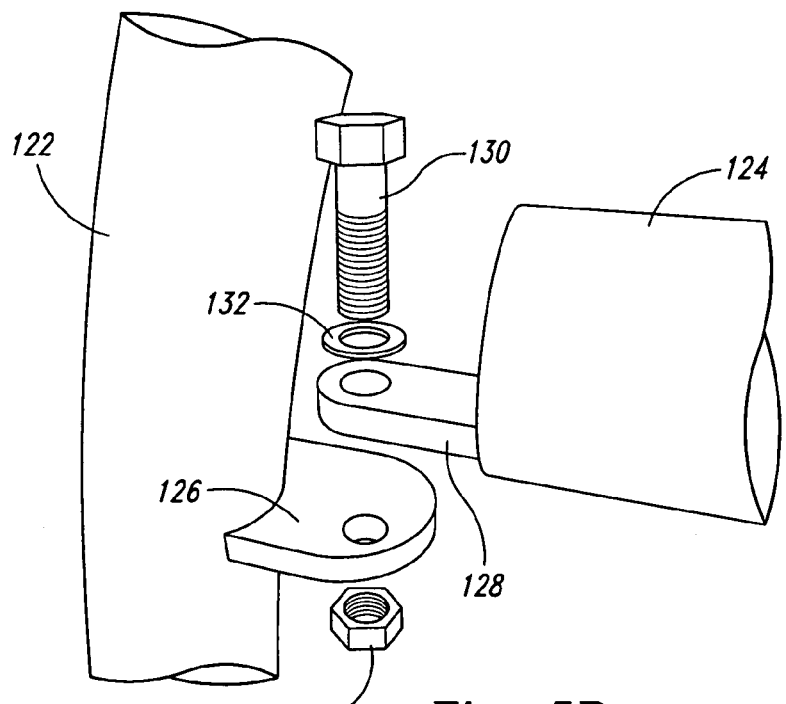
Figure 6A:
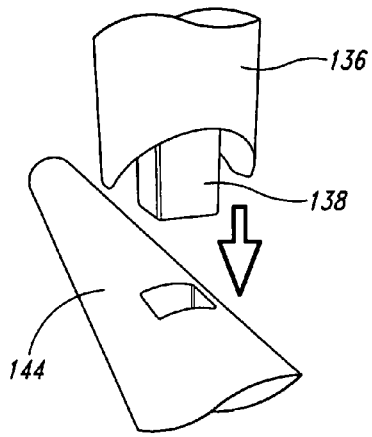
FIGS. 6 (a)-(d) show RMS 7.
Figure 6B:
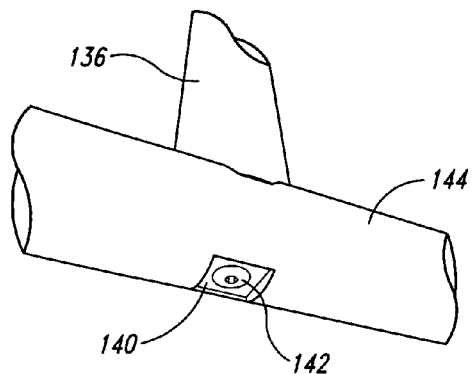
Figure 6C:
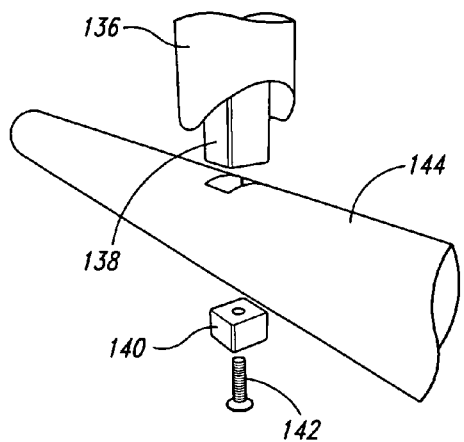
Figure 6D:
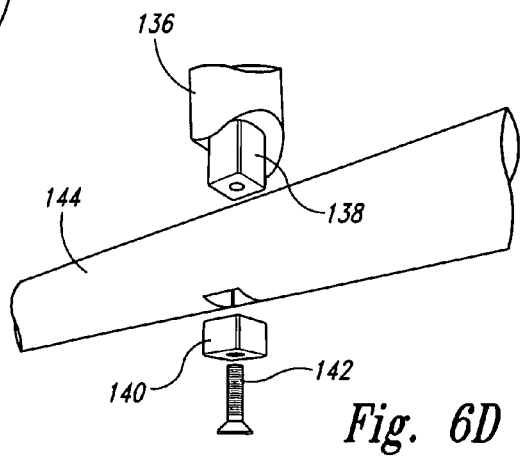

The forward end of the pipe 32 can be connected to the front door vertical pipe 22 by means of an RMS 4 (shown in FIG. 5). The other half of the pipe (32) can be connected to the trailing edge of the front door by a RMS 8 semi-permanent mounting system as shown in FIG. 3 that allows the door to open and close in a full range of motion allowing the driver/passenger to enter and exit the vehicle wile keeping the protective system intact. The trailing edge of the pipe (32) mates with the upper receiving tab on pipe (24) which when combined with (RMS 8) keeps the pipe in a restrained position to the vehicle/protective system when the door can be in its fully closed position. The Front Door Bottom Pipe (34) travels horizontally along the front door and connects to front door vertical pipe 22 by means of an RMS 4 connecter as shown in FIG. 5 whereby pipe 34 has the fixed mounting tab of the RMS 4 connecter. The other half of the pipe (32) can be connected to the trailing edge of the front door by a semi-permanent mounting system, RMS 8 that allows the door to open and close in a full range of motion allowing the driver/passenger to enter and exit the vehicle while keeping the protective system intact. The trailing edge of the pipe (32) mates with the receiving lower tab on pipe (24) which when combined with (RMS 8) keeps the pipe in a restrained position to the vehicle/protective system when the door can be in its fully closed position.

The Passenger Door Top Pipe (36) travels horizontally along the rear passenger door, below the passenger window, between the Mid-Down Pipe (24) and the forward vertical pipe of the Rear Quarter Panel Section (28). At the forward end of the pipe (36) can be a fixed mounting tab that forms half of the system (RMS 5) that connects it to the Mid-Door Down Pipe (24). The other half of the pipe (36) can be connected to the trailing edge of the rear door by a semi-permanent mounting system (RMS 8—Detailed operation discussed in FIG. 3) that allows the door to open and close in a full range of motion allowing the rear passengers to enter and exit the vehicle while keeping the protective system intact. The trailing edge of the pipe (36) mates with the upper receiving tab on the forward pipe of the rear quarter panel section (28) which when combined with (RMS 8) keeps the pipe in a restrained position to the vehicle/protective system when the door can be in its fully closed position.

Figure 8A:
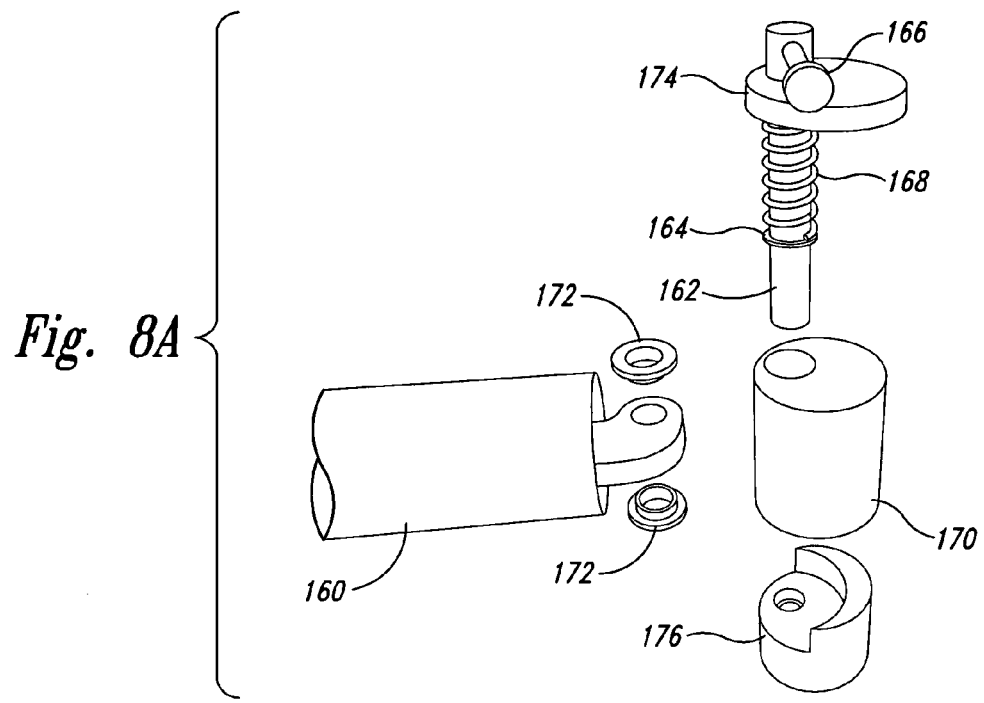
FIGS. 8 (a) & (b) show RMS 5.
Figure 8B:
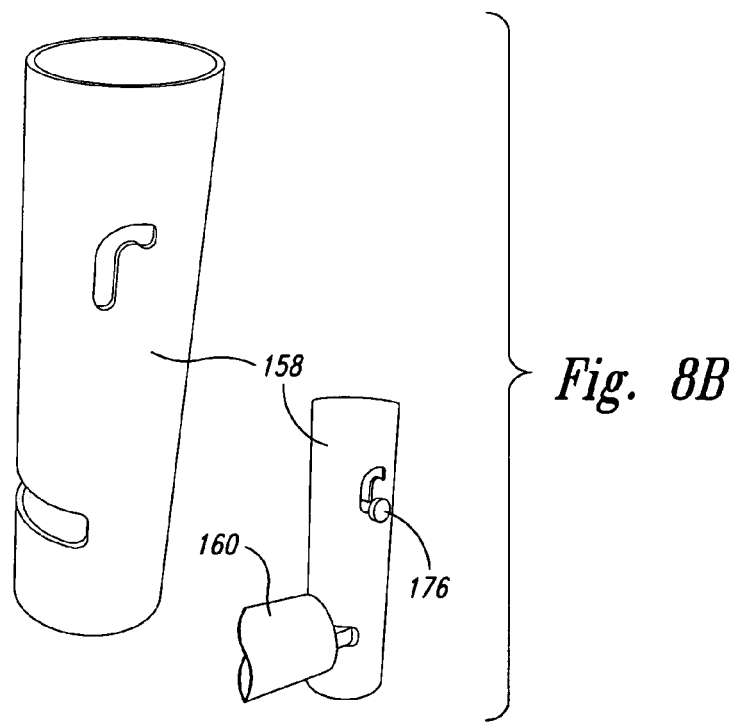

The Passenger Door Bottom Pipe (36) travels horizontally along the rear passenger door, below the top pipe (36), between the Mid-Down Pipe (24) and the forward vertical pipe of the Rear Quarter Panel Section and in a manner that mirrors the shape of the rear fender well. Pipe (38) can be attached to mid-door vertical pipe 24 by means of an RMS 5 connecter wherein the end of pipe 38 can have a fixed mounting tab that forms half of the RMS 5 connecter that connects it to the Mid-Door Down Pipe 24 as shown in FIG. 8. The other half of the pipe (36) can be connected to the trailing edge of the rear door by a semi-permanent mounting system (RMS 8—Detailed operation discussed in FIG. 3) that allows the door to open and close in a full range of motion allowing the rear passengers to enter and exit the vehicle while keeping the protective system intact. The trailing edge of the pipe (36) mates with the upper receiving tab on the forward pipe of the rear quarter panel section (28) which when combined with (RMS 8) keeps the pipe in a restrained position to the vehicle/protective system when the door can be in its fully closed position.

FIG. 2 shows removable mounting system 3 (RMS 3), which attaches the ends of two pipes. An exploded view of a system used to retain two connecting pipes in relationship to each other. The ends of pipes that connect flush to others parts of the system are fixed and protected from abrasion by a clamping system [FIGS. 2 (a), (b) and (c)]. The first connecting pipe (50) can have two holes, one countersunk to seat the head of a bolt (52) flush to the surface of the pipe. The other hole exits the opposite end of the pipe perpendicular to the pipe wall and across from the first hole. A nylon bushing (54) can be shaped and fitted on its opposing ends. One end can be created to meet flush with the outside diameter of the connecting pipe (50). The other end can be created with a number of edges running longitudinally to the bushing in a fin-shaped manner so that it can mate to a metal anchor (56) with negative impressions of the first part (54). The edges retain the bushing (54) in its position so that it can not rotate about itself when seated in the anchor. Running through the entire length of the bushing (54) can be a hole created at the correct diameter to allow a bolt (52) or other fastener to pass through the bushing.

The slotted bushing anchor (56) can be a metal anchor with edges recessed inside the anchor and created in a fashion so as to receive the fitted bushing (54) and keep it from rotating around itself. The slotted bushing anchor (56) can have a hole created at the correct diameter to allow a Bolt (52) to pass through its length. The end of the slotted bushing anchor (56) can have a nut (58) welded to the end opposite of the receiving end and sized to retain the Bolt (52) in its secure position. The slotted bushing anchor (56) can be then welded into place inside the end of the connecting pipe (60) securing all the parts of the assembly and the pipes to each other. RMS 3 has been used in the preferred embodiment in FIGS. 1 (a) & (b) to connect the bumper to pipes 13 and 30. Front Door Down-Pipe (22) that travels along the leading edge of the driver and front passenger doors, is connected to pipe 20 using RMS 3.

FIG. 3.) Door Slider System (RMS 8). An exploded view of a system used to maintain a pipe (70) in a fixed position outside the door (46) as it travels through a range of movement, up to its full range of movement and allow vehicle occupants to enter and exit the vehicle. As the door (46) opens and closes, the pipe (72) rotates outward in tandem with the vehicle door in a rotational plane substantially equal to the vehicle hinge and the hinge system (86) (RMS 4). The system eliminates what would normally be binding between the pipe (72) and door (46) by letting the fixed point of the door clamp (84) (FIG. 3c, Item 100) to travel through the pipe channel (82) as needed. The system utilizes the Door Clamp Attachment system (RMS 8) at one end, and a hinge system (RMS 4) at the other end. This discussion details the function of one Door Pipe Slider. More than one door pipe (70) can be used across the side of the vehicle and function in tandem with the first one. The door pipe (72) can be constructed with a slide and channel (82) internal to the pipe and traveling along its length. The vehicle facing-side of the channel can be smaller than the inside of the channel which functions to retain the sliding block (FIG. 3c, Item 88) as it travels through the distance of the pipe. At one end of the channel can be an opening (FIG. 4, Item 118) that permits the sliding block (FIG. 3c, Item 88) to exit the slide and channel (82) and free the pipe from the Door Clamp Attachment System (RMS 8). At the other end of the channel can be an ejection point (FIG. 4, Item 120) for removing debris from the system. As the sliding block (FIG. 3c, Item 88) slides towards the exit (FIG. 4, Item 120) debris can be forced out of this opening. On the rear inner side of the vehicle door, the system mounts (84) to the vehicle with a plate (80) using the factory bolt locations (FIG. 4, Item 114). At the trailing end of the pipe can be one of two configurations for the Door Pipe Receiver (FIG. 10) that further retains the pipe (72) from movement.

Figure 3A:
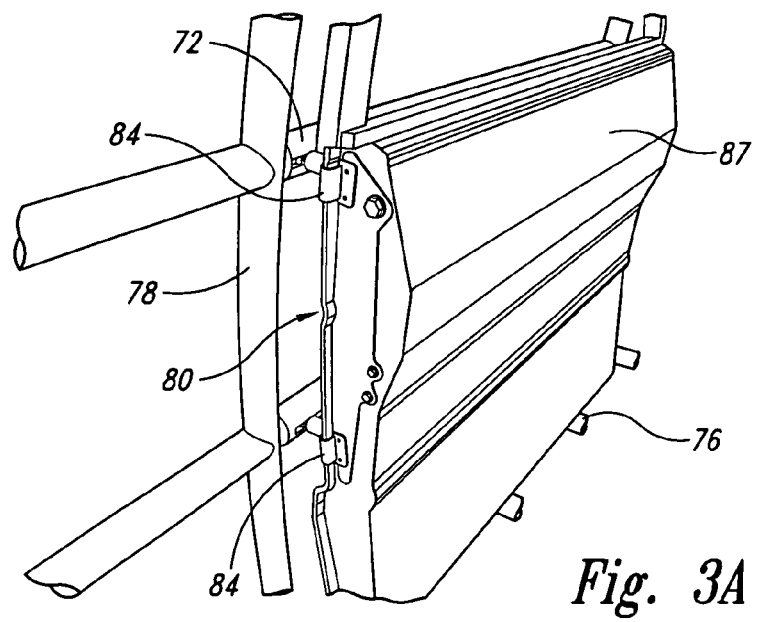
FIGS. 3 (a)-(h) show RMS 8, a door slider system, which is a system for attaching a protective pipe to the door, which allows for the door to readily open.
Figure 3B:
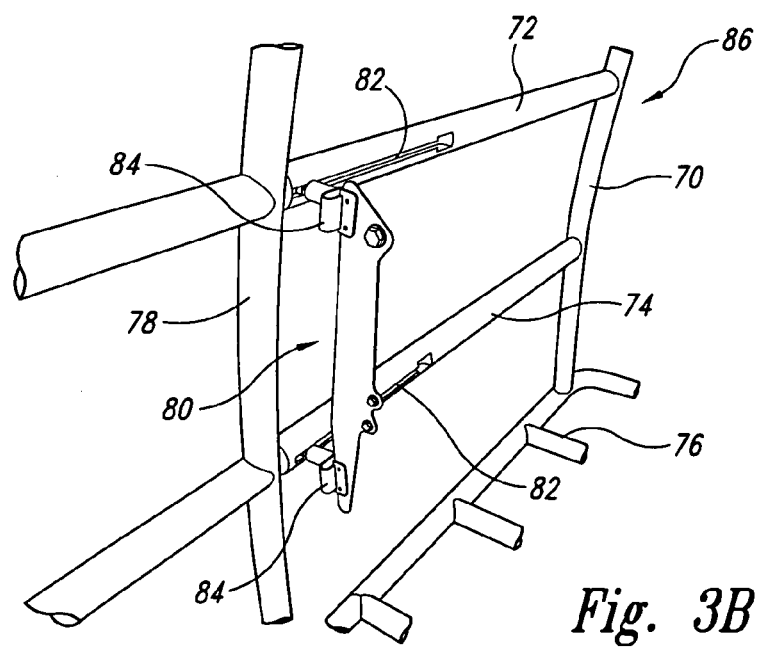
Figure 3C:
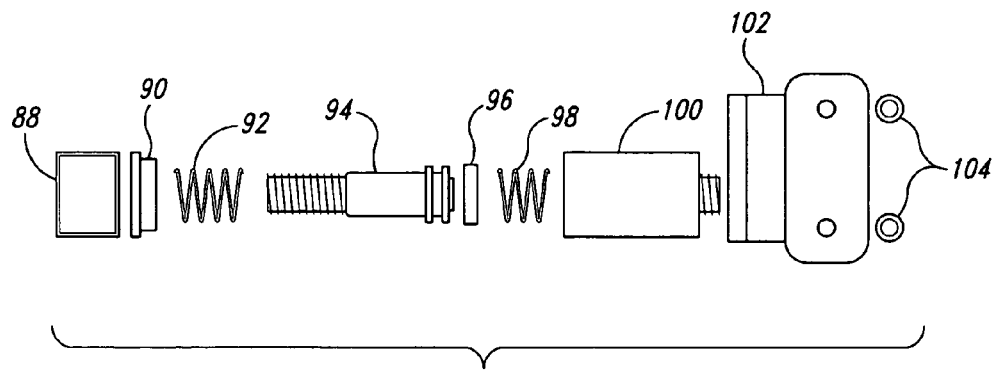
Figure 3D:
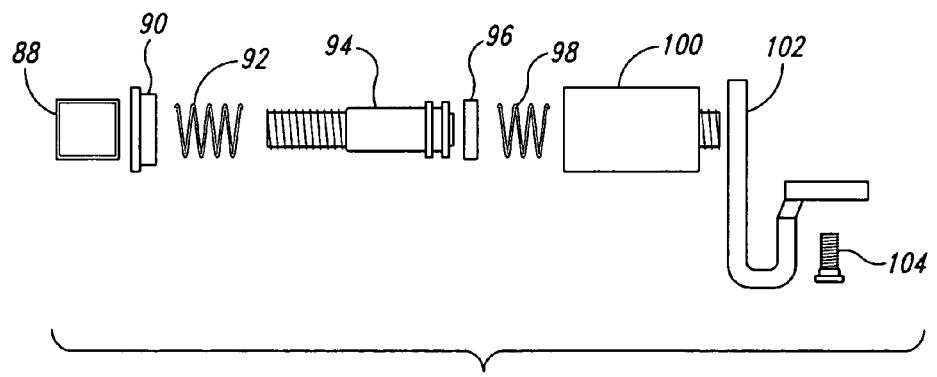
Figure 3E:
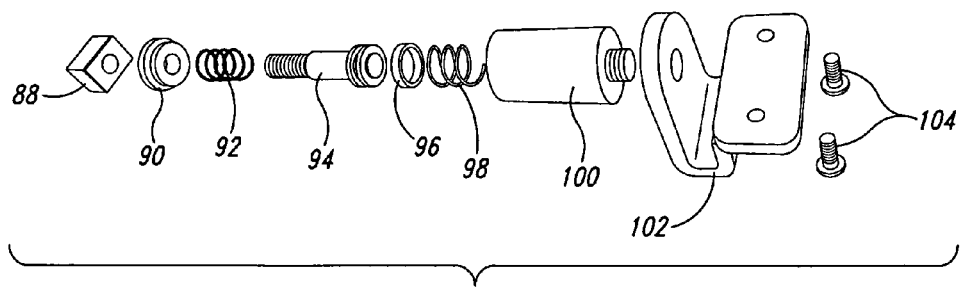
Figure 3F:
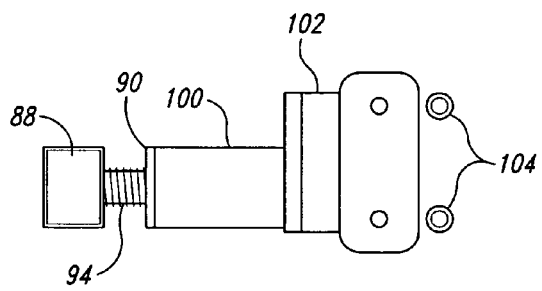
Figure 3G:
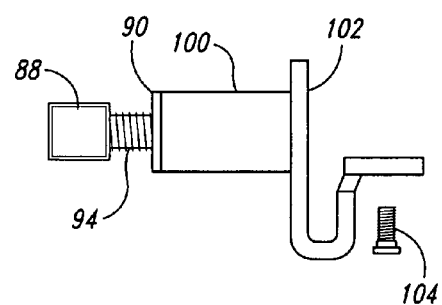
Figure 3H:
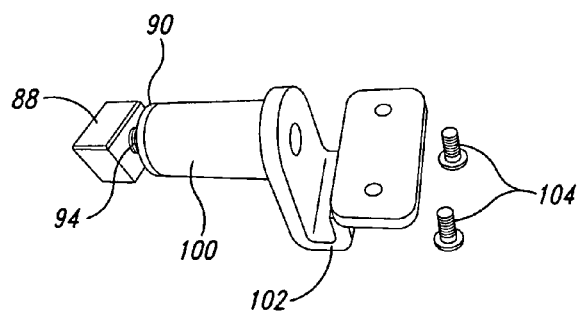
Figure 4A:
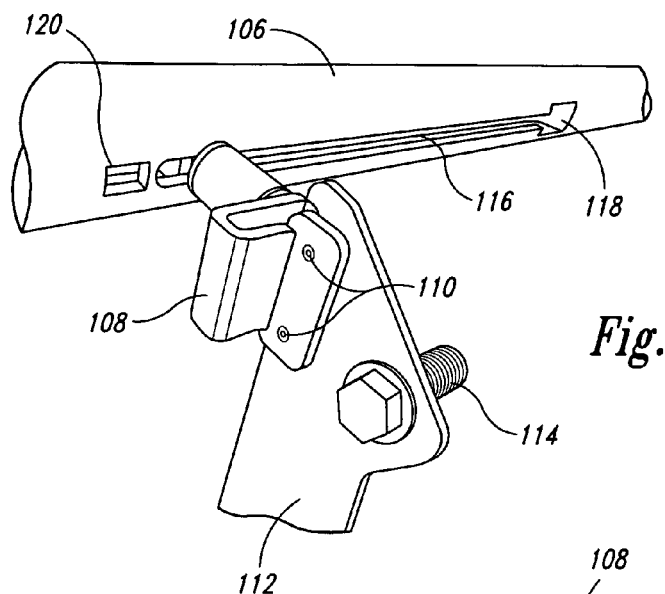
FIGS. 4 (a)-(c) show a detailed construction of a preferred system for attaching a door to a pipe.
Figure 4B:
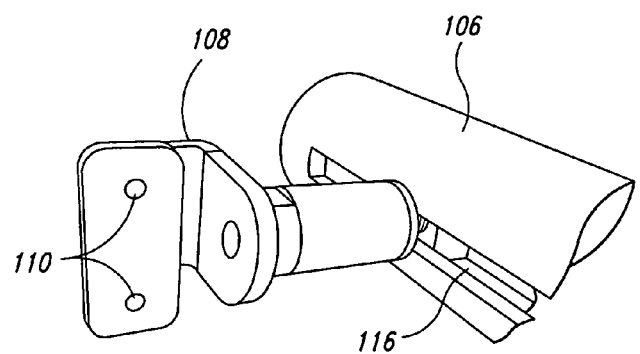
Figure 4C:
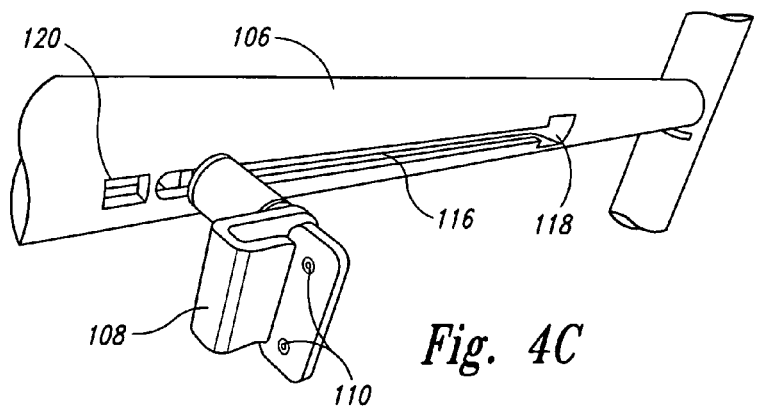

FIG. 3c) Door Clamp Attachment System. An exploded view of a system used to retain a sliding door pipe (FIG. 3, Items 72,74) in relationship to the door through the doors full range of movement and allow vehicle occupants to enter and exit the vehicle. A sliding block (88) forms the retaining and sliding point between the door clamp attachment system and the sliding door pipe. A plastic cap (90) forms the seal to protect the internal mechanism. It can have a hole created inside it to match the diameter of the piston (94) that will travel through it. A spring (92) creates tension for the outer end of the piston as it moves towards the cap seal (90). The piston (94) can be threaded for attachment to the sliding block (88) when fully assembled. Two parallel metal edges formed at the end of the piston create points to secure a gasket (96). The gasket (96) can be of an inner diameter to fit snugly against the piston (94) and the outer diameter to move against the inside edge of the piston housing (100). The function of the gasket (96) can be to keep water and debris from entering the piston housing and its components. A second spring (98) creates tension for the inside end of the piston as it moves towards the piston housing (100). Both springs and the piston (94) create a cushion to reduce pressure against the door panel as the pipes flex. (FIG. 3, Items 72, 74)

The piston housing (100) can be created from solid metal with a cylindrical channel traveling from one end that forms the opening to the other end which stops within the metal forming the stop for the spring. The threaded end of the housing (100) mates with the threaded end of the door clamp (102). The door clamp (102) can be designed to travel around the trailing edge of the front door and meet inside the door with a metal plate (FIG. 4, Item 112) where it can be retained by two screws (104). The door plate can be held in place to the inside of the door by one or more bolts (FIG. 4, Item 114). The shape of the door clamp (102) can be determined by the factory shape and specifications of the vehicle.

FIG. 4.) Door Slider System (Detail). A door pipe (106) can have its position retained by a removable door clamp (108). The system keeps the pipe in both a fixed distance from the vehicle door and restrains the pipe from any vertical movement during the full travel of the vehicle door. The door clamp can be fixed to a door plate (112) by two retaining screws (110), countersunk into the door plate. One or more bolts (114) attach the door plate to factory bolt locations. A slide and channel (116) can be welded to the inside of the pipe. One opening travels the length of the required pipe distance and its opening can be smaller than the inside of the channel so as to hold the sliding block (FIG. 3c, Item 88) and door clamp (108) to the pipe (106). One point at the leading end of the channel (118) can be sized to allow the sliding block (FIG. 3c, Item 88) to be released from the door pipe (106) when removing the pipe from the vehicle. One additional hole (120) in the door pipe can be located toward the rear of the pipe which can be shaped for the sliding block to force debris to exit the channel (116) while still retaining the door clamp (108).

FIG. 5.) Door Slider System—Hinge (RMS 4). A device that functions as a hinge for the door pipe (124) in a door slider system. At the forward end of the Front Door Top Pipe (124) can be a tab (128) with a hole in it matching the diameter of the retaining bolt (130). The Front Door Down Pipe (122) can have a base tab (126) with a hole the same diameter of the retaining bolt (130) and which resides in a position to allow for the proper rotational axis of both the pipe and door as they open and close. The pivot tab (128) can be retained to the base tab (126) by a bolt (130) a washer (132) and a nut (134). Threads on the bolt stop at the upper end of the bolt so that the pivot tab (128) can rotate freely around the smooth sides at the top of the bolt.

FIG. 6.) Tab Mounting System (RMS 7) A device for retaining a pipe in a slot with a threaded screw. At two locations on the step rail (FIG. 1, Item 16) are receiving points/holes in the base pipe (144) that match the shape of the connecting pipe (136) tab. The tab receiving hole in the base pipe (144) can be a square tube welded vertically from both bottom and top edges of the pipe. When the connecting pipe (136) can be inserted into the hole of base pipe (144) it travels to a point in the pipe where a threaded metal stop (140) resides. This stop, along with the coping of the connecting pipe limits further movement vertically. The metal stop (140) can be a threaded section of metal which can be welded vertically inside the vertical walls of the square tube in pipe (144). The threaded section travels through the complete length of the metal stop (140) and can be of a diameter to allow the Allen head cap-screw (142) to pass through it. The end of the metal tab on the connecting pipe (136) can be also threaded to a diameter that fits the Allen head cap-screw (142). When the screw (142) can be completely threaded between the stop (140) and tab (138) the connecting pipe (136) can be maintained in a fixed position.

Figure 7A:
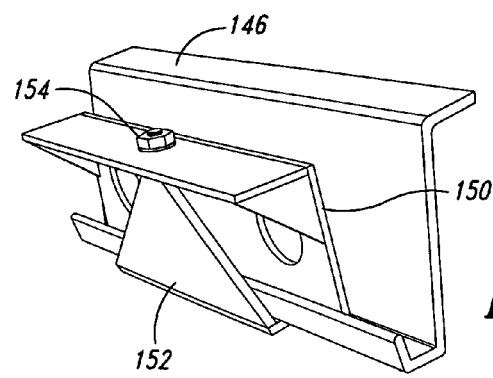
FIGS. 7 (a)-(c) show RMS 1.
Figure 7B:
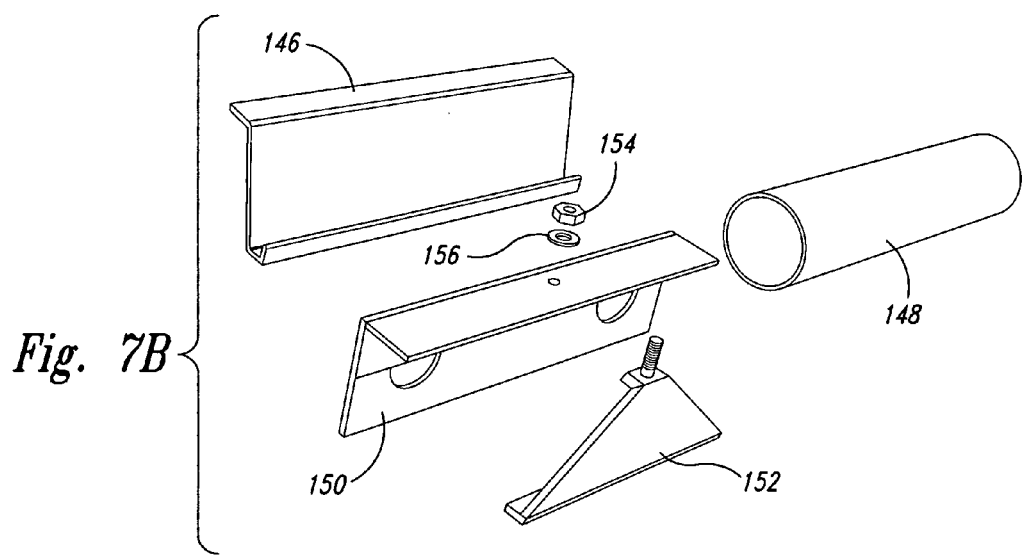
Figure 7C:
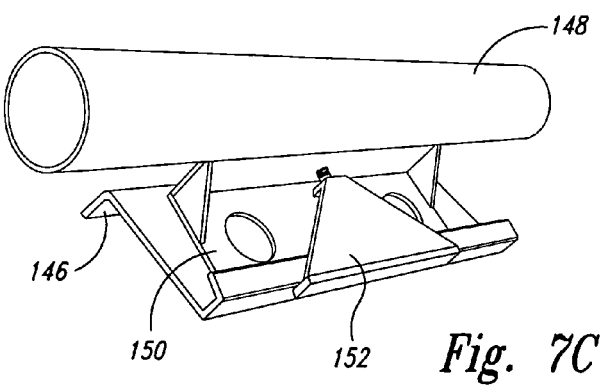

FIG. 7.) Drip Rail Mounting System (RMS 1) A system for attaching a mounting device to a vehicle roof line or drip rail (146). The mechanism can be a clamping system that retains itself to the drip rail (146) with a clamp plate (152) and a back plate (150). Tension can be maintained between the plates (150, 152) and the drip rail with a nut (154) and washer (156) that pull the clamping plate (152) towards the back plate (150). The clamp plate (152) can have an upper edge with a threaded shaft welded to it. The lower edge of the Clamp Plate (152) can be created in a fashion to slide under the drip rail and secure itself against upward tension from the Back Plate (150). The Back Plate (150) can be constructed with a hole in the top surface to receive the threaded section of the Clamp Plate (152). Two plates on either side of the Back Plate reinforce the top surface where it attaches to the pipe (148). The rear of the Back Plate can be welded at its edges to the top and side plates. The bottom edge acts to restrain the Back plate to the Drip Rail (146) as it pulls the Clamp Plate (152) towards itself. Permanently mounted to the each Drip Rail Mounting System can be either the rear or front drip rail mounting points (FIG. 1, Items 18, 20) show in FIG. 7 as item (148).

FIG. 8.) Interior Pipe Door-Hinge (RMS 5). An exploded view of a system used to retain the leading end of a door pipe and act as its hinge through the full movement of the vehicle door. Except for the Pin Handle (166), the components reside within the interior of the Hinge Pipe (158).

The Hinge Pipe can be constructed with two openings. One opening faces the leading end of the Connecting Pipe (160) and the other faces the vehicle body. The $1^{st}$ hole allows insertion of the tab on the connecting pipe (160), and the $2^{nd}$ hole allows the pin (162) to travel its full length as well as providing a resting point for the pin when retracted. The Connecting Pipe can have a metal tab welded inside at one end, and the other side of the tab extends parallel to the ground plane to a rounded point with a hole drilled through it vertically. The hole can have a set diameter so as to receive and match the ends of two bushings (172) and one pin (162) when fully assembled and restrained.

The pin (162) forms both the retaining point and the hinge point for the connecting pipe (160) when the system can be in a locked position. At one end of the pin (162) can be a washer (164) which can be welded to the pin and acts as a downward point of resistance for the spring (168) as the pin can be retracted. The spring (168) can have a second upward point of resistance from the top plate (174) which can be welded inside the tube (170). The top plate also can have a hole drilled through it which can have the additional functions of restraining sideways movement of the pin as well as keeping debris from entering the pipe. At the top of the pin (162) can be a handle (166) which can be of a length and diameter to allow it to extend beyond and through the hinge pipe (158) and permit the operator to move the pin (162) through its full length of travel.

Welded to the inside of the hinge pipe (158) can be a two-stage metal tube (170). The first stage can be of a diameter to allow the washer (164) and spring (168) to travel through the tube (170) as the system can be operated. The second stage can be of a diameter to allow only the pin (162) to travel through it. This two-stage metal tube acts to maintain the vertical movement of the spring to a set distance as well as restrict the pin's (162) horizontal movement. A bottom plate (176) can form the base for the internal part of the system inside the pipe (160). The plate can have a hole of a set diameter that does not travel through the entirety of the plate and acts to receive the lower end of the pin (162) when the pin can be fully extended and engaged. The plate (176) can be welded internal to the hinge pipe (158) and can have an additional function of forming a resting place for the connecting pipes tab (160) and to keep debris out of the pipe (158). Two bushings (172) are used to insulate the hinge components as the connecting pipe rotates with the door. The bushings have an outer diameter to allow them to seat inside the connecting pipe tab hole (160), and an internal diameter to allow the pin (162) to travel through them.

FIG. 9.) Door Plate Mount (RMS 9) A system used to retain a pipe in a fixed position in relationship to the vehicle. The Door Plate Mount can have a fitted plate (182) designed to follow the contours of the vehicle striker plate (180). A second plate, the connecting plate (184) can be shaped to connect between the fitted plate and a plate welded on to the connecting pipe (186). All three plates can be connected to each other with wide-head Allen screws (188) that travel into or through tapped and countersunk holes in each plate.

FIG. 10.) Door Pipe Receiver A system used in conjunction with the door slider system to help limit horizontal and vertical movement of the door pipes when they are in the locked position as defined by the door being fully closed. The door pipe receiver has two exemplary configurations in the system, one with a pin (200) welded to the end of the door pipe the other with an extended tab (194) welded to the support sleeve (198). In both configurations the end of the door pipe (192) can be shaped with an internal radius that mates with the outside diameter of the down pipe (190) when in a locked position. In FIG. 10, the first configuration can be detailed in the top two diagrams, while the second configuration can be detailed in the bottom two diagrams. The first configuration can have the pin (200) welded permanently to the door pipe (192). The down pipe (190) can have a receiving slot (202) created internal to the pipe that acts as a receiving point for the pin (200) and limits upward and downward travel of the door pipe (192) when the door can be in a locked position. This pin receiver (202) limits horizontal travel of the door pipe (192) inward towards the door. The second configuration can have the extended tab (194) welded permanently to the support sleeve (198), which can be welded to the down pipe (190). The support sleeve (198) can be created with an internal diameter created in a manner as to fit around part of the outer diameter of the door pipe. This support sleeve (198) limits horizontal travel of the door pipe (192) inward towards the door. The door pipe (192) can have a receiving slot (196) created internal to the pipe that acts as a receiving point for the extended tab (194) and limits upward and downward travel of the door pipe (192) when the door can be in a locked position.

FIG. 11) Receiving Tab. A mount with a tab shaped in a manner so as to receive and restrain a connecting pipe. The base (204) can be one of many foundations, for the purposes of this discussion, either a flat metal plate as used in (FIG. 1, Item 14), or as a receiving pipe (FIG. 1, Item 22) for a connecting pipe (FIG. 1, Item 44). The receiving plate (206) has an inner diameter that matches the outer diameter of the incoming pipe (214) so as to hold it flush against the plate. In order for the plate (206) to receive the diameter of the incoming pipe (214) the receiving plate (206) must have an opening angle of no more than 180 degrees as it faces the direction of the incoming pipe (214). The receiving plate (206) has welded into it a nut of sufficient size as to restrain a bolt (212). The pipe has a bushing (210) inserted into it with an outside diameter that is equal to the diameter of the pipe and is of sufficient height to protect the base (204) from the pipe (214) when being installed. The rest of the bushing (210) is of a diameter equal to the inner diameter of the pipe (214) and of such length so that it may be inserted and restrained inside the pipe (214) The bushing (210) has a hole traveling through both ends to allow a bolt (212) to travel through it when the system is seated appropriately. The pipe (214) has two holes traveling through its walls horizontally and directly opposite from each other. The holes from the receiving plate (206), the bushing (210) and the pipe (214) all line up with each other so a bolt (212) can be inserted and threaded through to the nut (208) in a manner which restrains the parts as a whole.

Figure 12A:
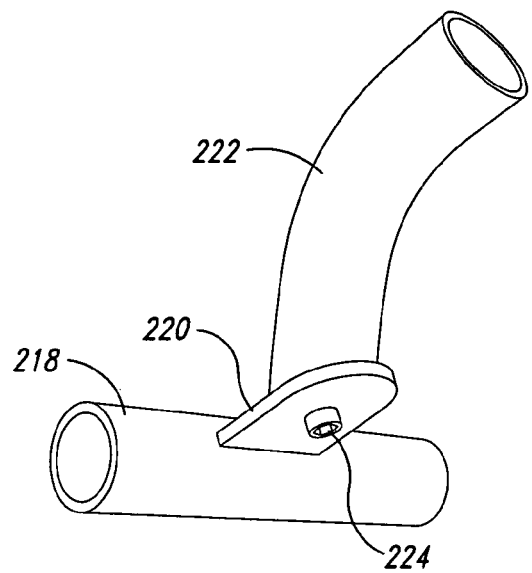
FIGS. 12 (a) & (b) show RMS 2
Figure 12B:
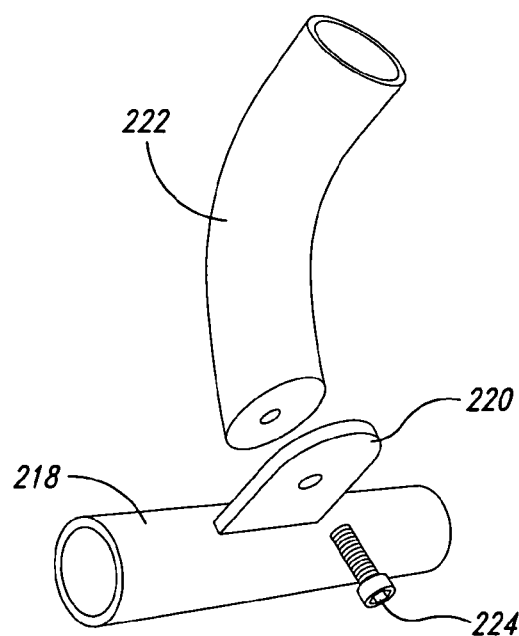

FIG. 12.) Extending Tab (RMS2)

A functioning view and exploded view of a system for attaching a pipe to an extended tab of another pipe. The base pipe (218) has a connecting tab (220) permanently fixed to the base pipe (218). Within the connecting tab (220) is a hole of such diameter so as to receive and retain a bolt (224). The incoming pipe (222) has fixed within its connecting end a threaded hole of the same diameter to receive and restrain the bolt (224). When the system is in its functioning state the bolt (224) aligns and retains the incoming pipe (222) to the base pipe (218) through the connecting tab (220).

Figure 13A:
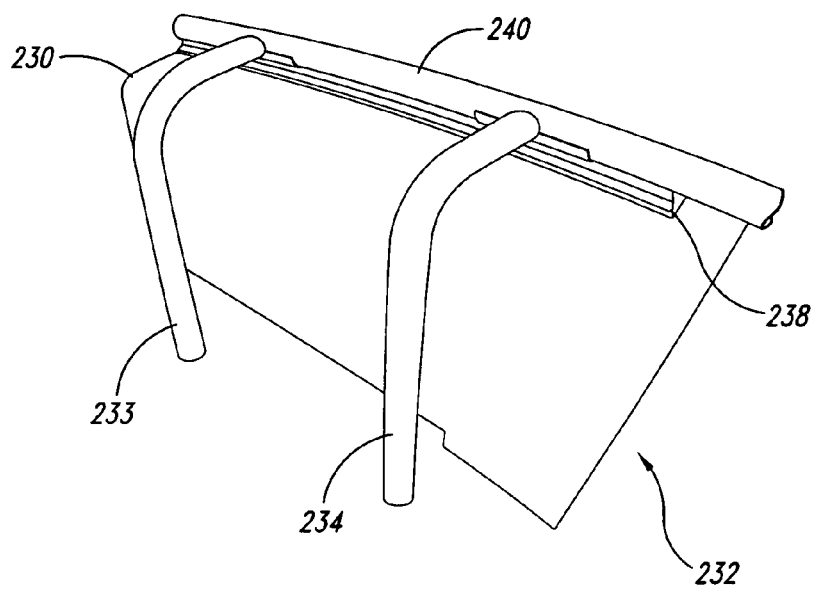
FIGS. 13 (a) & (b) show an alternative clamping mechanism for protective pipes on a roof when the roof does not have a drip rail.
Figure 13B:
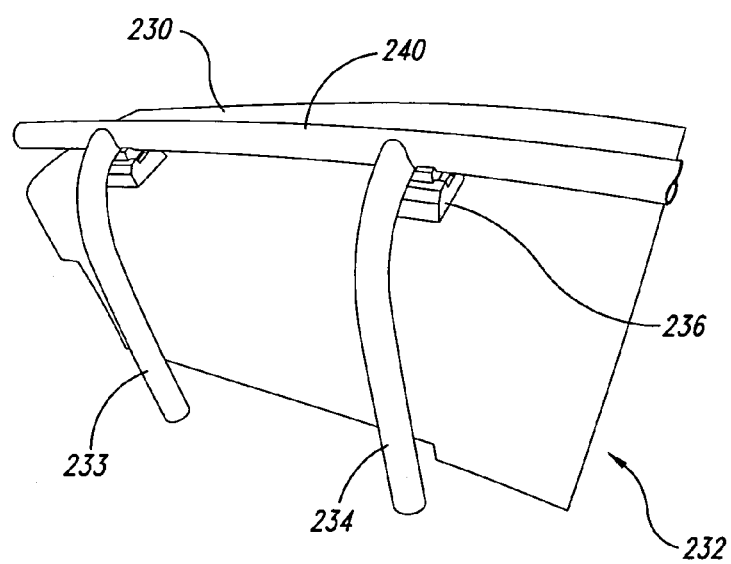

An Alternative Clamping System is shown in FIGS. 13 (a) & (b). A view of alternate removable clamping systems and techniques that could provide the function of retaining a removable protective system for a vehicle body. This "cut-away" view represents part of a typical automotive section with a open void between the door and the vehicle body. Furthermore a pinch seam is represented by a grove in the vehicle roof where two or more vehicle body parts are joined together. Both are indicated in the diagram at the top right corner.

The uppermost drawings in the diagram describe a clamping system that makes use of the vehicle pinch seam. A clamp (238) travels along the pinch seam and utilizes this structural strong point of the vehicle as it travels longitudinally to the seam in order to disperse forces across the length of the vehicle.

The lowermost drawings in the diagram describe a clamping system that makes use of the void between the vehicle door and roof-line to clamp against the body section exposed by the entryway of the door. One or more Door Clamps (236) can be employed to create a clamping point for the removable system.

Clamping mechanisms are not exclusive to, or limited by these two systems, but represent how vehicle features could be used in a variety of ways to create locations for attachment of a removable protective system. Locations are defined by and adapted to the specific design features of each automobile as created by the manufacturer.

Pipe patterns represented are not specific to any defined layout and are for reference only.

Also attached to the vehicle in FIGS. 13 (*a*) & (*b*) is a protective plate 233. Protective plate 233 can be made of Kevlar, steel or any other strong material to give further protection to the vehicle and its occupants.

From the foregoing, it will be appreciated that, although specific embodiments have been discussed herein for purposes of illustration, various modifications may be made without deviating from the spirit and scope of the discussion herein. Accordingly, the systems and methods, etc., include such modifications as well as all permutations and combinations of the subject matter set forth herein and are not limited except as by the appended claims.

What is claimed is:

1. An easily removable external protection system for a vehicle sized to convey at least one human being, the protection system configured to form at least a partial cage that at least partially encompasses at least three sides of the vehicle, the cage comprising at least two mounting points configured to easily removably attach the cage to the vehicle, and a plurality of elongated members configured to form a web that protects portions of the vehicle surrounded by the web, wherein at least three of the elongated members are configured to easily removably attach to each other such that at least each of the adjacent sides of the cage can be easily attached to and separated from each other, at least one side of the cage comprising a plurality of members configured to slide and rotate relative to each other to form a door portion, wherein the door portion comprises at least one door mounting point operable to attach to a door of the vehicle.

2. The system of claim 1 wherein the cage encompasses at least three sides of the vehicle.

3. The system of claim 1 wherein the cage encompasses at least four sides of the vehicle.

4. The system of claim 1 wherein the cage encompasses at least five sides of the vehicle.

5. The system of claim 1 wherein the cage encompasses at least the front and two lateral sides of the vehicle.

6. The system of claim 1 wherein the cage encompasses at least two lateral sides and the top of the vehicle.

7. The system of claim 1 wherein the cage comprises two door portions.

8. The system of claim 1 wherein the cage comprises four door portions.

9. The system of claim 1 wherein at least one door portion comprises a connecting means to a door wherein said connecting means functions so as to allow the door to open without removing the door portion of the cage.

10. The system of claim 9 wherein said connecting means is a door slider system.

11. The system of claim 1 wherein the door portion comprises a pipe or rod traveling horizontally relative to the door, and said pipe has a channel running lengthwise proximal to the door and the door has a hinging element that inserts into said channel wherein said hinging element travels along the length of the pipe as the door is opened or closed.

12. The system of claim 1 wherein the door portion comprises a hinge element that connects to a hinge element of a vertical protecting element, wherein the door portion bends in the same direction of the door when the door is opened or closed.

13. The system of claim 1 wherein the elongated members are hollow tubes.

14. The system of claim 13 wherein the hollow tubes are circular in cross-section.

15. The system of claim 13 wherein the hollow tubes are hexagonal in cross-section.

16. The system of claim 1 wherein the vehicle is selected from the group consisting of a self-propelled automobile, a sport utility vehicle, a car, a camper shell and a trailer configured to be towed behind a self-propelled automobile.

17. The system of claim 1 wherein at lest two mounting points are configured to attach to a bumper of the vehicle.

18. The system of claim 1 wherein at least two mounting points are configured to attach to an undercarriage of the vehicle.

19. The system of claim 1 wherein at least two mounting points are configured to attach to a drip rail of a roof of the vehicle.

20. The system of claim 1 wherein the system further comprises a plurality of protective panels attached to at least one side of the cage to provide at least one substantially walled-in side.

21. The system of claim 20 wherein the protective panels are configured to be easily attachable and removable from the elongated members.

22. The system of claim 20 wherein the protective panels comprise at least one of Kevlar, Armor, or Steel.

23. The system of claim 1 wherein the system further comprises a plurality of pipes and rods, wherein at least two of said pipes or rods are connected to each by means of a removable mounting system.

24. An external protection system for a vehicle comprised of at least one rod, pipe or hollow tube, wherein said rod, pipe or hollow tube runs horizontally across a door of the vehicle and is slidably attached to said door enabling the door to open while the rod, pipe or hollow tube is attached to said door, and wherein the rod, pipe or hollow tube has a channel running along the length of said rod, pipe or hollow tube proximal to said door, and said door has a hinge element attached to said door and wherein a portion of said hinge element inserts into the channel so that the hinge element glides along the length of said rod, pipe or hollow tube as the door is opened or closed allowing said door to open while the rod, pipe or hollow tube is attached to said door.

25. A method of creating an easily removable external protection system for a vehicle size to convey at least one human being and having at least one door, comprising:

a) providing a plurality of elongated members configured to form a plurality of webs that each protect a portion of the vehicle surrounded by the web, wherein the webs comprise at least three adjacent sides of a cage, the cage encompassing the at least one door and having at least one pipe, rod or hollow tube that is attached horizontally to the door, the at least one rod, pipe or hollow tube having a channel running along the length of the rod, pipe or hollow tube that is proximal to the door, and wherein the door has a hinge element attached to the door that fits into the channel of the pipe, rod or hollow tube, the hinge element being able to slide along the length of the channel upon opening or closing of the door so as to allow the door to open while having the pipe, rod or hollow tube attached thereto;

b) removably attaching the plurality of webs to each other to provide at least three adjacent sides of the cage, the cage being configured to at least partially encompass at least three sides of the vehicle;

c) mounting the cage on the vehicle; and d) opening and closing the door without removing the cage from the vehicle.

26. The method of claim 25 wherein b) and c) are reversed.

27. The method of claim 25 wherein the method further comprises:

e) removing the cage from the vehicle.

28. The method of claim 25 wherein the horizontal rod, pipe or hollow tube is hingably connected to a vertical rod, pipe or hollow tube, which runs up and down a side of the door so as to allow the door to open while the horizontal rod, pipe or hollow tube is attached to said door.

29. The method of claim 25 wherein the protective cage is comprised of two or more modules, wherein each module is comprised of two or more rods, pipes or hollow tubes attached to each other and wherein each module has means for attaching to said vehicle.

30. The method of claim 25 wherein the vehicle is selected from the group consisting of a self-propelled automobile, a sport utility vehicle, a car, a camper shell and a trailer configured to be towed behind a self-propelled automobile.

31. The method of claim 25 wherein at least two mounting points are configured to attach to a bumper of the vehicle.

32. The method of claim 25 wherein at least two mounting points are configured to attach to an undercarriage of the vehicle.

33. The method of claim 25 wherein at least two mounting points are configured to attach to a drip rail of a roof of the vehicle.

34. The method of claim 25 wherein the method further comprises attaching a plurality of protective panels to at least one side of the cage to provide at least one substantially walled-in side.

35. The method of claim 34 wherein the protective panels are configured to be easily attachable and removable from the elongated members.

36. The method of claim 34 wherein the protective panels comprise at least one of Kevlar, Armor, or Steel.

37. The method of claim 25 further comprising connecting a plurality of pipes, hollow tubes or rods by means of a removable mounting system.

38. An easily removable external protection system for a vehicle sized to convey at least one human being, the protection system configured to form at least a partial cage that at least partially encompasses at, least three sides of the vehicle, the cage comprising at least two mounting points configured to easily removably attach the cage to the vehicle, and a plurality of elongated members configured to form a web that protects portions of the vehicle surrounded by the web, wherein at least three of the elongated members are configured to easily removably attach to each other such that at least each of the adjacent sides of the cage can be easily attached to and separated from each other, at least one side of the cage comprising a plurality of members that form a door portion, wherein the door portion comprises at least one door mounting point operable to attach to a door of the vehicle and a connecting means that functions so as to allow the door to open without removing the door portion of the cage.

* * * * *